(12) United States Patent
Edwards et al.

(10) Patent No.: US 11,394,630 B2
(45) Date of Patent: Jul. 19, 2022

(54) SYSTEM AND METHOD FOR NON-INVASIVE NETWORKED DEVICE INSPECTION BASED ON PASSIVELY-CAPTURED DEVICE TRAFFIC

(71) Applicant: Cylera, Inc., New York, NY (US)

(72) Inventors: James Edwards, New York, NY (US); Apostolos Bakoyiannis, New York, NY (US)

(73) Assignee: Cylera, Inc., New York, NY (US)

( * ) Notice: Subject to any disclaimer, the term of this patent is extended or adjusted under 35 U.S.C. 154(b) by 0 days.

(21) Appl. No.: 17/352,440

(22) Filed: Jun. 21, 2021

(65) Prior Publication Data

US 2021/0314243 A1  Oct. 7, 2021

Related U.S. Application Data

(63) Continuation of application No. PCT/US2019/068367, filed on Dec. 23, 2019.

(60) Provisional application No. 62/783,915, filed on Dec. 21, 2018.

(51) Int. Cl.
| | | |
|---|---|---|
| *G06F 15/173* | (2006.01) | |
| *H04L 43/062* | (2022.01) | |
| *H04L 43/04* | (2022.01) | |
| *H04L 43/10* | (2022.01) | |
| *H04L 43/12* | (2022.01) | |

(52) U.S. Cl.
CPC ............ *H04L 43/062* (2013.01); *H04L 43/04* (2013.01); *H04L 43/10* (2013.01); *H04L 43/12* (2013.01)

(58) Field of Classification Search
CPC .......... H04L 43/04; H04L 43/10; H04L 43/12
See application file for complete search history.

(56) References Cited

U.S. PATENT DOCUMENTS

| | | |
|---|---|---|
| 10,397,116 B1 | 8/2019 | Volpe et al. |
| 10,587,491 B1 | 3/2020 | Volpe |
| 11,005,806 B1 | 5/2021 | Saldanha et al. |
| 2005/0066086 A1* | 3/2005 | Ramanathan ....... G06F 9/45537 710/63 |
| 2005/0066088 A1* | 3/2005 | Helfinstine ........ A61N 1/37252 710/71 |
| 2007/0271371 A1 | 11/2007 | Singh Ahuja et al. |
| 2010/0268933 A1* | 10/2010 | Frattura .............. H04L 12/4641 713/151 |

(Continued)

OTHER PUBLICATIONS

International Search Report and Written Opinion issued for the PCT Application No. PCT/US19/68367, dated Apr. 16, 2020, 20 pages.

*Primary Examiner* — Yves Dalencourt
(74) *Attorney, Agent, or Firm* — Cooley LLP

(57) ABSTRACT

A method for non-invasive network device inspection includes identifying a target device, and receiving, at a compute device: a copy of a first set of messages sent to the target device, and a copy of a second set of messages sent from the target device. The copy of the first set of messages and the copy of the second set of messages are stored as historical data. The device is then emulated, via a processor of the compute device, based on the historical data. The emulating includes receiving a signal encoding a request from a remote requestor, and comparing at least a portion of the request to at least a subset of the historical data, to determine a response representative of a response from the target device.

22 Claims, 10 Drawing Sheets

(56) References Cited

U.S. PATENT DOCUMENTS

| | | |
|---|---|---|
| 2011/0231510 A1 | 9/2011 | Korsunsky et al. |
| 2011/0242979 A1 | 10/2011 | Feroz et al. |
| 2011/0276709 A1 | 11/2011 | Deninger et al. |
| 2013/0007239 A1 | 1/2013 | Agarwal. et al. |
| 2013/0247194 A1* | 9/2013 | Jha ................ A61B 5/0022 726/23 |
| 2013/0347103 A1* | 12/2013 | Veteikis ............ H04L 43/04 726/22 |
| 2017/0366395 A1 | 12/2017 | Goldfarb et al. |
| 2018/0046811 A1* | 2/2018 | Andriani ......... H04L 63/1425 |
| 2018/0124069 A1* | 5/2018 | Ettema ........... H04L 63/1491 |
| 2018/0309595 A1 | 10/2018 | Ma |
| 2020/0213151 A1 | 7/2020 | Shrivatsan et al. |

\* cited by examiner

| Attribute | Similarity ratio | Value |
|---|---|---|
| User Agent | <0.1% | "Mozilla/5.0 (Windows NT 10.0; WOW64) AppleWebKit/537.36 (KHTML, like Gecko) Chrome/70.03538.110 Safari/537.36" |
| Accept | 20.82% | "text/html,application/xhtml+xml,application/xml;q=0.9,image/webp,image/apng,*/*;q=0.8" |
| Content encoding | 53.76% | "gzip, deflate, br" |
| Content language | 4.80% | "en-US,en;q=0.9" |
| List of plugins | 4.13% | "Plugin 0: Chrome PDF Plugin; Portable Document Format; internal-pdf-viewer. Plugin 1:Chrome PDF Viewer; ; mhjfbmdgcfjbb paeqjofohoefgiehjai. Plugin 2: Native Client; ; internal-nacl-plugin." |
| Detail of the plugins | | |
| | 25.01% | Native Client |
| | 34.96% | Chrome PDF Viewer |
| | 10.90% | Chrome PDF Plugin |
| Platform | 39.17% | "Win32" |
| Cookies enabled | 80.37% | "yes" |
| Do Not Track | 49.38% | "NC" |
| Timezone | 5.70% | "300" |
| Screen resolution | 1.38% | "1280x720x24" |

FIG. 1

SYSTEM AND METHOD FOR NON-INVASIVE NETWORKED DEVICE INSPECTION BASED ON PASSIVELY-CAPTURED DEVICE TRAFFIC

CROSS-REFERENCE TO RELATED APPLICATIONS

This application is a bypass Continuation of International Patent Application No. PCT/US2019/068367, filed Dec. 23, 2019 and titled "A System and Method for Non-Invasive Networked Device Inspection Based on Passively-Captured Device Traffic," which claims priority to and benefit of U.S. Provisional Application No. 62/783,915, titled "System and Method for Non-Invasive Networked Device Inspection Based on Passively-Captured Device Traffic," filed Dec. 21, 2018, the entire disclosure of which is incorporated by reference herein in its entirety.

FIELD

The present disclosure relates to network security, and more specifically, to inspection of networked devices.

BACKGROUND

A variety of commercially available and open-source tools exist that can assist network administrators in determining information about, and inspecting the devices on, their network.

SUMMARY

In some embodiments, a method for non-invasive network device inspection includes identifying a target device, and receiving, at a compute device: a copy of a first set of messages sent to the target device, and a copy of a second set of messages sent from the target device. The copy of the first set of messages and the copy of the second set of messages are stored as historical data. The device is then emulated, via a processor of the compute device, based on the historical data. The emulating includes receiving a signal encoding a request from a remote requestor, and comparing at least a portion of the request to at least a subset of the historical data, to determine a response representative of a response from the target device. The response can then be sent to the remote requestor.

In some embodiments, a method for non-invasive network device inspection includes identifying a target device based on an identifier of the target device. Network traffic associated with the target device is monitored at a compute device. Based on the monitoring, network traffic data is stored, e.g., in a memory of the compute device. The target device is emulated, via a processor of the compute device and based on the historical data, without communicating with the target device and without interacting with the target device during the emulating.

In some embodiments, a non-transitory processor-readable medium stores code representing instructions to cause a processor to identify, via a processor of a compute device, a target device, and to receive a copy of a first set of messages sent to the target device. The code also represents instructions to cause the processor to receive a copy of a second set of messages sent from the target device, and to store the copy of the first set of messages and the copy of the second set of messages as historical data, e.g., in a memory of the compute device. An emulator can then be generated, the emulator configured to mimic an output of the target device, via a processor of the compute device, based on the historical data and without knowledge of a firmware or hardware of the target device.

BRIEF DESCRIPTION OF THE DRAWINGS

It is to be understood that the drawings primarily are for illustrative purposes and are not intended to limit the scope of the subject matter described herein.

FIG. 1 illustrates an example device fingerprint, according to some embodiments.

DETAILED DESCRIPTION

Figure 2:
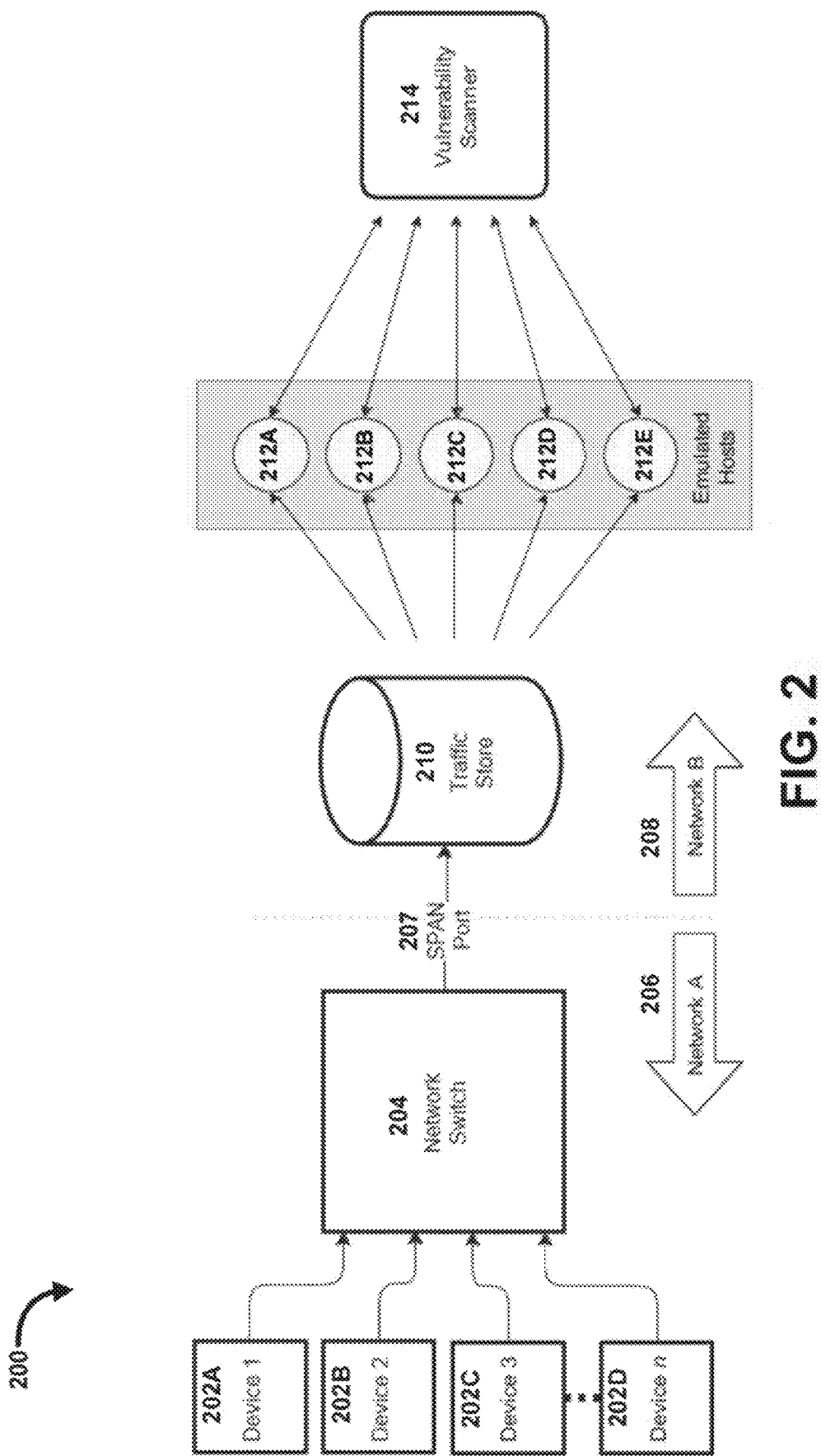
FIG. 2 is a diagram showing an example device inspection system implementation, according to some embodiments.

Known device inspection methods (e.g., device fingerprinting and vulnerability scanning—collectively "scanning tools") rely on an ability to communicate directly with the device under test. In many contexts, however, direct communication with devices under test is either not desired/preferred, or outright impossible. For example, since medical systems can measure, process and/or store sensitive patient information, many hospitals and patients are reluctant to permit direct communication (much less interrogation) of medical systems. As used herein, a "medical system" can refer to any of a wide variety of systems that are relevant to the practice of medicine, including (but not limited to): patient-facing devices (such as patient monitors, infusion pumps, etc.), imaging devices (e.g., positron emission tomography (PET), computerized axial tomography (CAT), x-ray, etc.), nurse/physician facing devices such as point of care analyzers and associated workstations, and repositories (e.g., an Electronic Medical Record (EMR) repository) storing sensitive patient information.

Embodiments of the present disclosure are directed to methods for non-invasive inspection of one or more networked compute devices, in which "online" tests can be run against an emulated networked compute device that is distinct from, and optionally not in communication with, one or more target devices (devices under test). By virtualizing a device under test, for example using passively captured device traffic, invasive scanning tools can be used on the virtual device, without any effect on the actual/target device(s) under test.

Device Fingerprinting

Device fingerprinting tools aim to identify certain attributes of network-connected hosts/devices. Different device fingerprinting tools operate at different levels of the network stack and, depending upon the level of operation, have access to different information for use during operation. For example, tools operating at "lower" network levels (i.e., Open Systems Interconnection (OSI) levels 2-4) typically use subtle characteristics of the device's network stack and implementation information to identify a device's operating system, while tools operating at higher levels typically attempt to identify the available services, web browser, browser extensions, etc., often along with the version of each. Additionally, tools (or individual identification modes of the tools) can be classified into being either active or passive.

Passive identification typically relies solely on either observed traffic or voluntarily submitted information. On the other hand, during active identification, the device fingerprinting tool typically probes the device under test, and whether and how the device under test (also referred to herein as a "host") responds factors into the determinations made by the device fingerprinting tool. An example excerpt from a report generated by a passive device fingerprinting tool, operating at the application layer, is shown in FIG. 1. As shown in FIG. 1, a fingerprinting tool report can include indications of attributes along with associated values and similarity ratios for the attributes.

Vulnerability Scanners

Vulnerability scanners, broadly speaking, attempt to assess the probability that a given device (i.e., a device under test) could be exploited by a specific, known vulnerability. Typically, as new vulnerabilities are discovered or as new vulnerability reports are released (e.g., via the Common Vulnerability and Exposures (CVE) database, the National Vulnerability Database (NVD), etc.), the author of, or contributor to, these tools create tests ("plugins") to determine whether a device under test is in fact vulnerable. These plugins almost exclusively require some interaction with the device under test. In some cases, a vulnerability scanner using the plugin is able to detect the presence or likelihood of a vulnerability without actually exploiting it (e.g., by reading a returned service banner when a client opens a connection, as illustrated by Snippet 1, below), while in other cases, the vulnerability scanner using the plugin attempts to perform the actual exploit, to detect whether or not the device under test is vulnerable to that exploit. The vulnerability scanner, typically including a supervisor and multiple such plugins, can then be used to inspect the device under test, and assess and catalog its vulnerability exposure.

>ftp
speedtest.tele2.net
Connected to
speedtest.tele2.net.
220 (vsFTPd 2.3.5)
Name (speedtest.tele2.netjames):
Snippet 1: Example service banner indicating the server is running version 2.3.5 of the vsFTPd FTP daemon System Overview In some embodiments, systems of the present disclosure overcome the various drawbacks discussed above, by non-invasively inspecting a networked device, through the observation of passively captured-device traffic. An example implementation of such a system is shown in FIG. 2. As shown in FIG. 2, the system 200 includes multiple devices (e.g., compute devices) 202A-202D, each communicatively coupled to a common network switch 204. The devices 202A-202D and the network switch 204 are included in a first network 206 (Network A). The network switch 204 is communicatively coupled, via a Switched Port Analyzer (SPAN port) 207 of a network switch of the target device's network, to a traffic store 210 of a second network 208 (Network B). Although the coupling between the network switch 204 and the traffic store 210 in FIG. 2 is shown and described as being a SPAN port, other types of coupling can be used as alternatives to (or in addition to) the SPAN port, including (but not limited to): a network tap (e.g. an internal network tap (see 320 in FIG. 3), a LAN/wide area network (WAN) connection (see 684 in FIG. 6), or an "inline" installation (e.g., if the functional blocks 686 and 688 in FIG. 6 were integrated into the same hardware as the WAN interface (e.g., a firewall) 682 of FIG. 6).

The second network 208 also includes multiple emulated hosts 212A-212E (or "device emulators"), each being communicatively coupled to the traffic store 210, and a vulnerability scanner 214 communicatively coupled to each of the emulated hosts 212A-212E. Each of the traffic store 210, the emulated hosts 212A-212E, and the vulnerability scanner 214 can be part of a common compute device that includes a processor (not shown). Alternatively, the traffic store 210, the emulated hosts 212A-212E, and the vulnerability scanner 214 can be stored across multiple compute devices in communication with one another. Each of the devices 202A-202D, a device including the network switch 204, a device including the traffic store 210, a device including one or more of the emulated hosts 212A-212E, and a device including the vulnerability scanner 214 can include a processor and a memory connected to that processor. The arrows in FIG. 2 represent connections (e.g., wireless network connections or wired network connections) between the associated components. In some embodiments, each emulated host (i.e., device emulator) emulates: (1) a single device under test, without emulating any other device under test, and/or (2) a single type of device under test, without emulating other types of devices under test. In other embodiments (e.g., in a "honey pot" application, discussed further below) each emulated host (i.e., device emulator) emulates: (1) multiple devices under test, and/or (2) multiple types of device under test, The system 200 of FIG. 2 can be regarded as including each of the following:

A Network of Interest—The first network 206 is a network of interest, including one or more devices of interest (or devices that will be "under test") that a user may desire to emulate.

Traffic Ingest/Intake and Store Functionality—Network traffic can be received/ingested (e.g., via a processor of a compute device hosting the traffic store 210), one or more of: selected, filtered, and transformed by the processor, and saved in the traffic store 210. The network traffic can be stored in any of a variety of storage formats, including (but not limited to) a format in which each row represents an observed data packet of the network traffic (e.g., using a relational database), or in a packet capture (PCAP) or next generation packet capture (PCAP-NG) format, which serialize and annotate (e.g., with attributes such as time received, bytes received, etc.) captured network traffic.

Emulated Hosts—As shown in FIG. 2, the emulated hosts 212A-212E (also referred to herein as "nodes" or "device emulators") can each be connected (e.g., via wired or wireless network connection) to the traffic store 210 and to the vulnerability scanner 214. Each of the emulated hosts can serve to "masquerade" as one or more of the devices under test (i.e., devices 202A-202D). In other words, a single emulated host (from emulated hosts 212A-212E) can simultaneously or substantially simultaneously emulate multiple devices under test, or can emulate a single device under test. In some embodiments, each emulated host is a distinct, physical machine (compute device). In other embodiments, a single compute device includes multiple emulated hosts. Each emulated host can be a virtual machine, or a container instance (discussed further below, with reference to FIG. 4). FIG. 5 (discussed below) provides an example outline of the behavior of an emulated host.

Vulnerability Scanner—The vulnerability scanner 214 can include any active scanning tool for inspecting a device. In some embodiments, the vulnerability scanner 214 is completely isolated from (i.e., has no communication with) the network of interest (the first network 206), and thus can have no effect on the devices (202A-202D) that communicate thereon.

Traffic Intake and Storage Capabilities

The traffic intake and storage capability can be implemented using a variety of designs, and can include a variety of functionalities, depending on the type, amount, and frequency of traffic to be analyzed. For example, for a home or small office network environment, a traffic store 210 may retain all packets transmitted to and from each host on the network. For networks of greater scale (e.g. large corporate or institutional networks), however, the volume of traffic that transits the network, both internally between machines on the LAN and between devices and the internet, may be too large to store for any significant amount of time. For such applications, the traffic intake capability (e.g., implemented via a configuration of an orchestrator, discussed below) can be designed to target or filter a selected/specified subset of devices of the network, for which to capture traffic (e.g., for a given time period, such as each day), or to select a subset of protocols and services to monitor within the network. Regardless of the method of filtering or down-sampling applied to the gathered data, the end result can be that the traffic of interest can be preserved—at least temporarily—in the traffic store (see FIG. 3).

In some embodiments, the traffic store 210 can be implemented using a flat file, such that "dumped" packets are simply appended. In other embodiments, the traffic store 210 can include a relational database that preserves the traffic information, e.g., with each of the ingested network traffic data packets corresponding to and represented by an associated row in a table. In still other embodiments, the traffic store 210 can include a graph database in which network hosts are represented by graph nodes of a graph, and communications observed between the hosts are represented as graph edges of the graph. As used herein, a "dumped" packet refers to a packet whose byte sequences and other associated contextual information have been recorded to a file. Such captured files can subsequently used for traffic analysis and/or in the generation of one or more databased for use in the traffic store (e.g., 210 of FIG. 2, 324 of FIG. 3, 688 of FIG. 6, etc.).

Orchestrator

In some embodiments, a system (such as system 300 of FIG. 3) includes an orchestrator 326, implemented in software and/or hardware in one or multiple compute devices, and responsible for the overall operation of the system (e.g., coordinating one or more of the activities discussed above, such as data ingestion, data storage, and emulation). The system 300 of FIG. 3 can correspond, for example, to a networked compute device that includes the traffic store of 210 and is in communication with a different network (e.g., Network A) that includes one or more devices under test. Functions of an orchestrator can include, but are not limited to, one or more of:

selection of a subset of devices (e.g., detected in the traffic store) to test;
assigning devices to emulators;
selecting appropriate data from the traffic store (or otherwise instructing the emulators to do the same, individually);
coordinating with the emulators, e.g., to determine when the emulators are ready for testing;
once the emulators are ready, configuring the batch scan job with an interrogator 330 (e.g., a device fingerprinter, a vulnerability scanner, etc.);
once scanning is complete, collecting, collating, filtering and distributing the data as specified by the system designer;
detecting a vulnerability, as a result of the scanning of the device emulator(s);
associating a vulnerability to the device(s) under test that the device emulator(s) was emulating during the scan;
sending a message representing an alert (e.g., for local display via a graphical user interface (GUI), to a remote compute device for rendering via a GUI of the remote compute device, etc.) in response to detecting the vulnerability; and
implementing a remediation measure (e.g., by sending remediation instructions to an administrator of the device(s) under test, partially or fully disabling the device under test from being able to operate, and/or the like.

Figure 3:
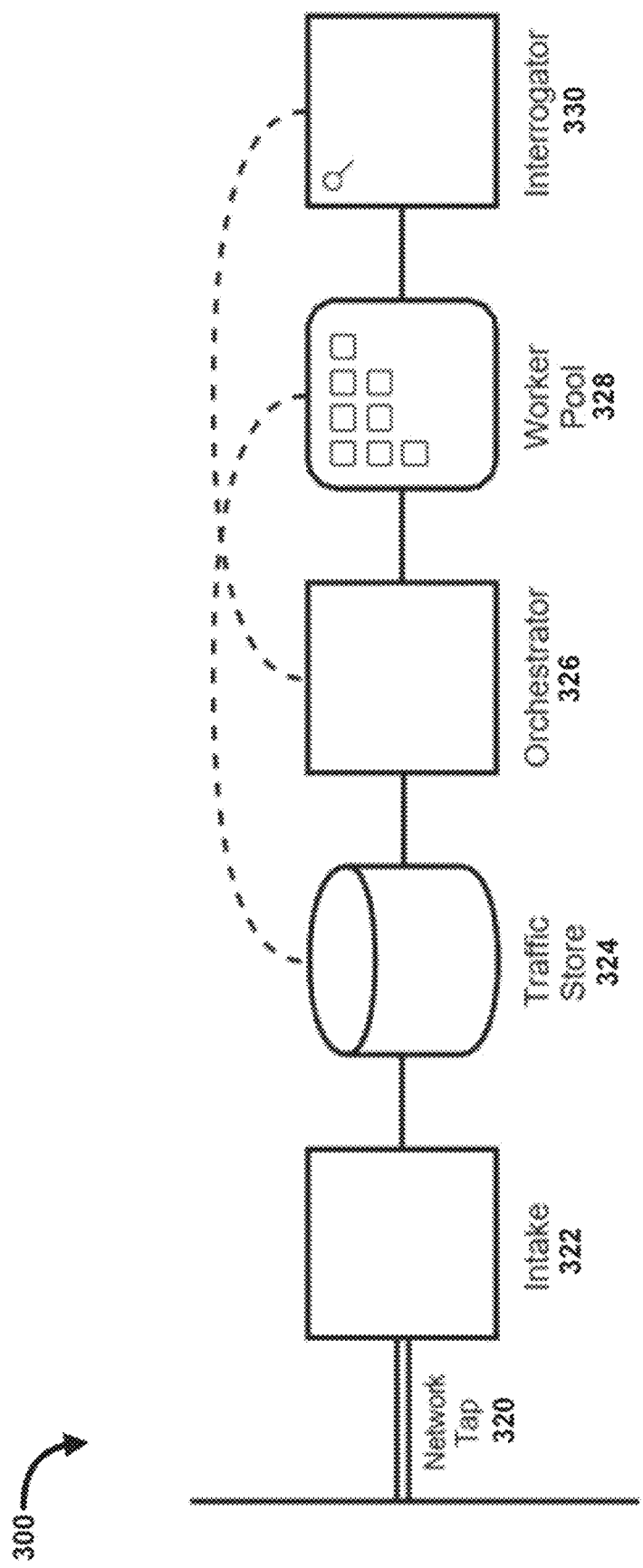
FIG. 3 is a diagram showing a traffic intake process, according to some embodiments.

As shown in FIG. 3, the system 300 (which may be implemented using one compute device or multiple networked compute devices) interfaces with a network of interest via a network tap 320. Network traffic data is received from the network of interest via the network tap 320, and received/ingested by an intake module 322 of the compute device(s). The network traffic data is optionally modified into a standardized file format (e.g., PCAP or a variant thereof), and then stored in the traffic store 324, which is communicably coupled to the orchestrator 326, which can coordinate the activities of each of multiple device emulators in a worker pool 328 and/or the interrogator 330 that inspects the device emulators of the worker pool 328 during emulated operation thereof. Although examples of interrogators provided above included device fingerprinting tools and vulnerability scanners, any other on-line scanning tool, whether active or passive, and whether commercial, open-source or in-house, could, alternatively or in addition, be used as the interrogator.

Figure 4:
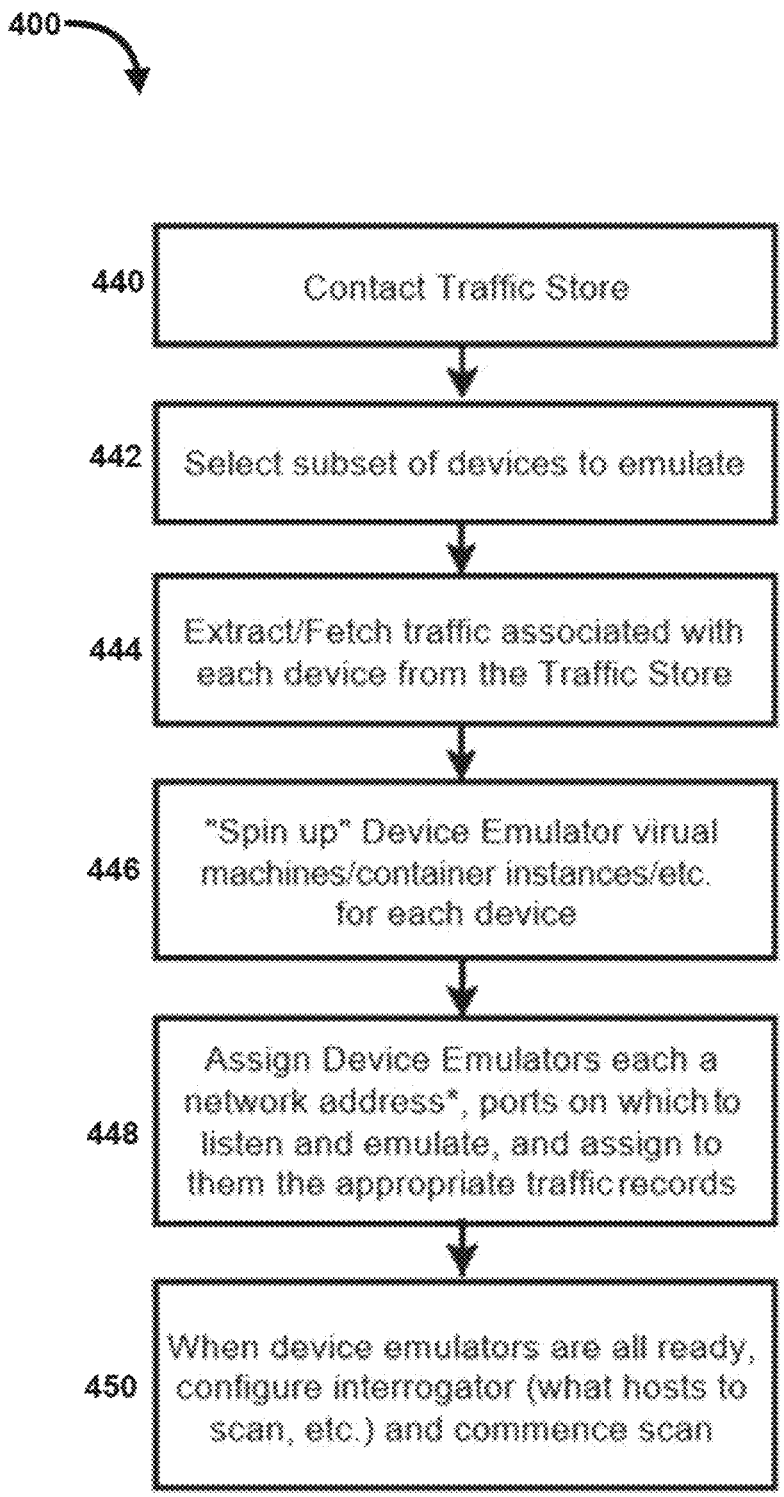
FIG. 4 is a flowchart showing orchestrator behavior, according to some embodiments
Figure 5:
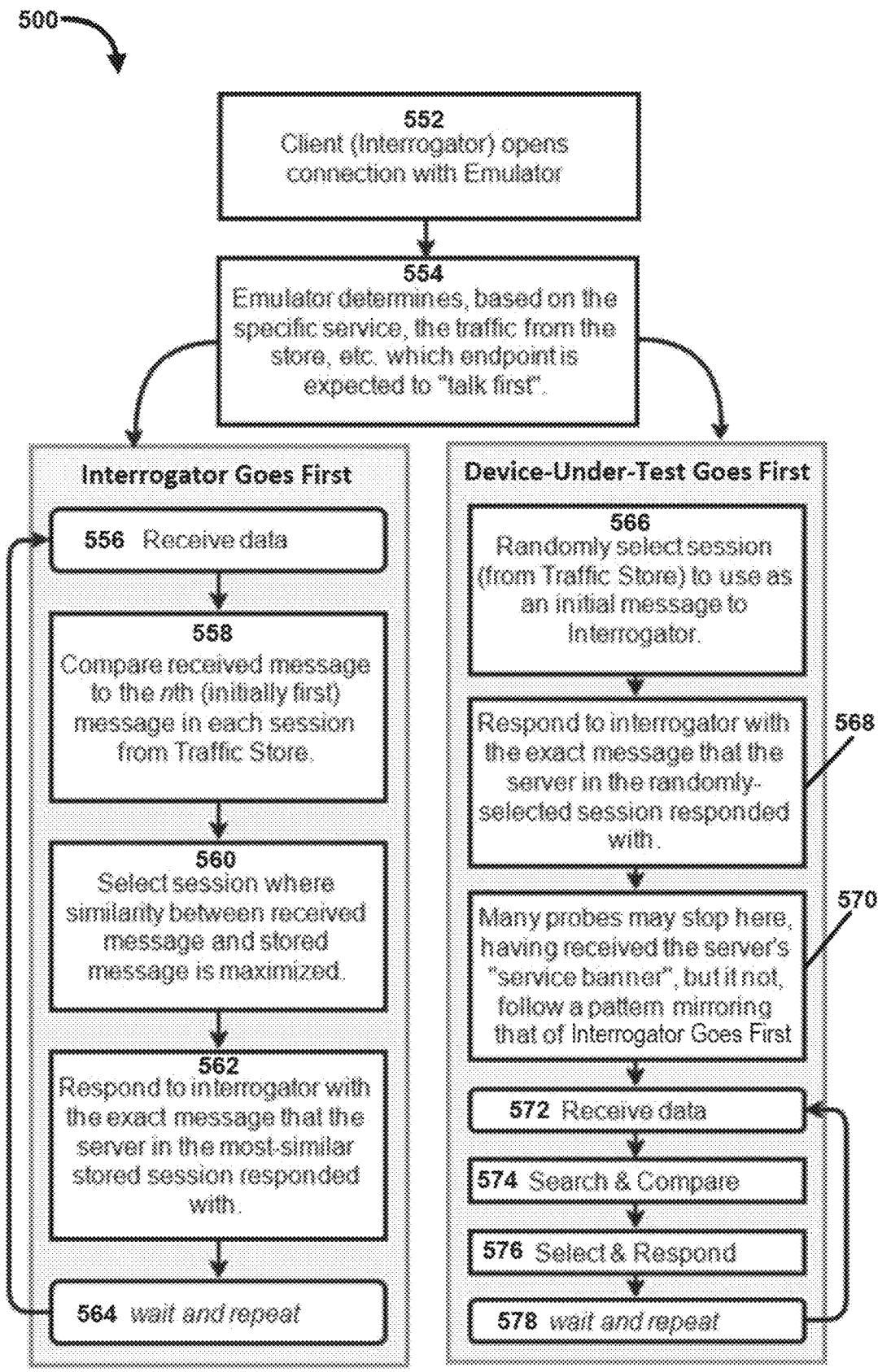
FIG. 5 is a flowchart showing device emulator behavior, according to some embodiments.

FIG. 4 presents an example workflow for an orchestrator (such as orchestrator 326 of FIG. 3) for coordinating the activities of multiple virtual machine or containerized instance emulators. As shown in FIG. 4, the workflow 400 begins with the orchestrator contacting the traffic store, at 440. The orchestrator identifies and selects, at 442, a subset of devices within the traffic store to emulate (i.e., devices under test). At 444, the orchestrator extracts (or "fetches") network traffic data, stored within the traffic store, associated with each device from the selected subset of devices. At 446, the orchestrator instructs/causes the instantiation of (i.e., "spins up") a device emulator for each device from the selected subset of devices to emulate. At 448, the orchestrator (1) assigns network addresses to each device emulator, (2) assigns ports for each device emulator, via which that device emulator can receive network traffic data (e.g., to "listen" and emulate the associated device under test), and (3) assigns the appropriate traffic records to each device emulator. Once all device emulators are ready (i.e., each of the actions at 448 has been completed), at 450, the orchestrator configures the interrogator (e.g., by specifying which device emulators to scan), and commences a scan of the device emulators.

Device Emulators ("Workers")

In some embodiments, although each device emulator can operate substantially simultaneously and/or in parallel with other device emulators, its workflow can be independent from the workflows of other device emulators. In other words, each device emulators' functioning may not be impacted by whether that device emulator is the sole device emulator, or is one of hundreds of device emulators. A description of example behaviors of a device emulator, and the overall role of a device emulator in systems of the present disclosure are set forth below.

As discussed above, device emulators serve to masquerade as, or behave as similarly as possible to, an associated device(s) under test. For example, in some embodiments, given a specific probe (e.g., a request) from an interrogator, and assuming the device emulator has access to an historical session containing the same or a similar probe (e.g., via the traffic store), the device emulator will respond exactly as the device under test previously did, or as similarly as possible.

As an example, consider a device under test that performs a "simple math" service on one of its ports, whereby clients can connect, present a simple math problem, and receive an answer from the server. As a result of ingesting previous network traffic data, the traffic store may include, as historical data, previously observed sessions, for example where: (a) 2+2 which was answered with 4, (b) 5×1 which was answered with 5, and (c) 8/4 which was answered with 2. If an interrogator of a device emulator associated with that device under test prompts the device emulator with the query 5×1, the device emulator can detect, within the historical data of the traffic store, that a similar request was previously sent to the device under test and resulted in the response "5," and thus may also respond with a 5, exhibiting behavior identical to that of the device under test.

Device inspection systems of the present disclosure can include device emulators that emulate messaging behaviors (i.e., input/output behaviors, query/response behaviors, request/response behaviors, etc.) of one or more device(s) under test based on monitored network traffic to and from the device under test. In some embodiments, the device emulators do not emulate internal processes or calculations of the device under test. Alternatively or in addition, the device emulators do not emulate one or more of: network connections (e.g., network tunnels, encapsulation, etc.), an operating system of the device under test, or the network stack.

FIG. 5 presents an example workflow for a device emulator implementation. In the workflow 500 of FIG. 5, the device emulator uses a "most-similar"-type selection scheme to determine which session is most applicable to emulate. Additionally, in the case that the device emulator is emulating a "server talks first" service, the workflow 500 of FIG. 5 includes a random selection of one session to use to begin the conversation, and thereafter uses the "most-similar" heuristic. As shown in FIG. 5, the workflow 500 begins with the interrogator opening a connection with the device emulator, at 552. At 554, the device emulator determines which endpoint (client or server) is expected to communicate (or "talk") first, for example, based on historical network traffic data in the traffic store and/or the service to be emulated (which, itself, may be detected by the device emulator based on the request received from the interrogator).

If the device emulator determines that the service to be emulated is an interrogator goes first" service, the device emulator receives data, at 556, from the traffic store, and at 558 compares the message received from the interrogator with messages in each session stored in the traffic store (i.e., each session deemed by the device emulator to be relevant to the request, or each session to which the device emulator has access, for example, as controlled by an orchestrator). The comparison can begin with a first message and progress sequentially through all messages, or the comparison can begin with an nth message within the traffic store. Embodiments in which a comparison begins with an nth message can include applications involving a protocol or protocols that are "stateless," in that no initial setup or handshake needs to occur. An example of a stateless protocol is HyperText Transfer Protocol (HTTP), in which a first message in a conversation can be the interrogator (or "client") sending a request for a specific item, and a first message (response) returned to the interrogator is typically the "answer" to the request. When emulating such protocols, embodiments of the present disclosure can be configured to respond to the interrogator with a best-matching known/ accessible/retrievable response. Suppose the traffic store stores data representing historical conversations "A,B,C," "A," and "D,E"—where the letters represent different "items" that were requested by interrogators/clients of the target device. The interrogator may begin communications by requesting "C." If following the "begin with a first message" approach, the response would be "A" or "D." Using, instead, a "being with nth message" approach, the interrogator's request can be intelligently matched with a previously-seen request from the historical data, at any stage/state of a stored conversation, to return a more suitable/representative answer.

At 560, the device emulator selects a session for which a similarity between the request from the interrogator (i.e., the received message) and a stored message within the traffic store is highest/maximized. The device emulator then respond to the interrogator, at 562, with the same response message that the server in the most-similar stored session responded with. The device emulator then waits, at 564, to receive a next request from the interrogator, at which point the device emulator will repeat steps 556 through 562 and return to the waiting step 564.

If the device emulator determines that the service to be emulated is a "device under test goes first" service, the device emulator randomly selects, at 566, a session from the traffic store to use as an initial message to the interrogator, and responds (at 568) with the same message that the server in the randomly-selected session responded with. At this point, the interrogation may terminate (e.g., since the interrogator has now received, via the response sent from the device emulator at 568, a service banner from the device emulator). Alternatively, if an additional message/request is received from the interrogator, the device emulator proceeds in a manner similar to the "interrogator goes first" workflow. In other words, the device emulator receives the additional request at 572, performs a search of the traffic store and compares the additional request with historical data at 574, selects a closest response from a previous session involving the device under test and responds with that closest response at 576, and waits at 578 for a further request from the interrogator. If another request is received from the interrogator, the device emulator can loop back to step 572 and reiterate the "interrogator goes first" workflow. Although the device emulator is shown and described, with reference to FIG. 5, as randomly selecting a session from the traffic store, in other embodiments the session(s) can be selected sequentially (e.g., to ensure that the same session is not tested twice and/or that no session is left untested), or selected based on the session being a "most recent" session (e.g., to ensure capture of any updates that have occurred).

Additional Embodiments

Figure 6:
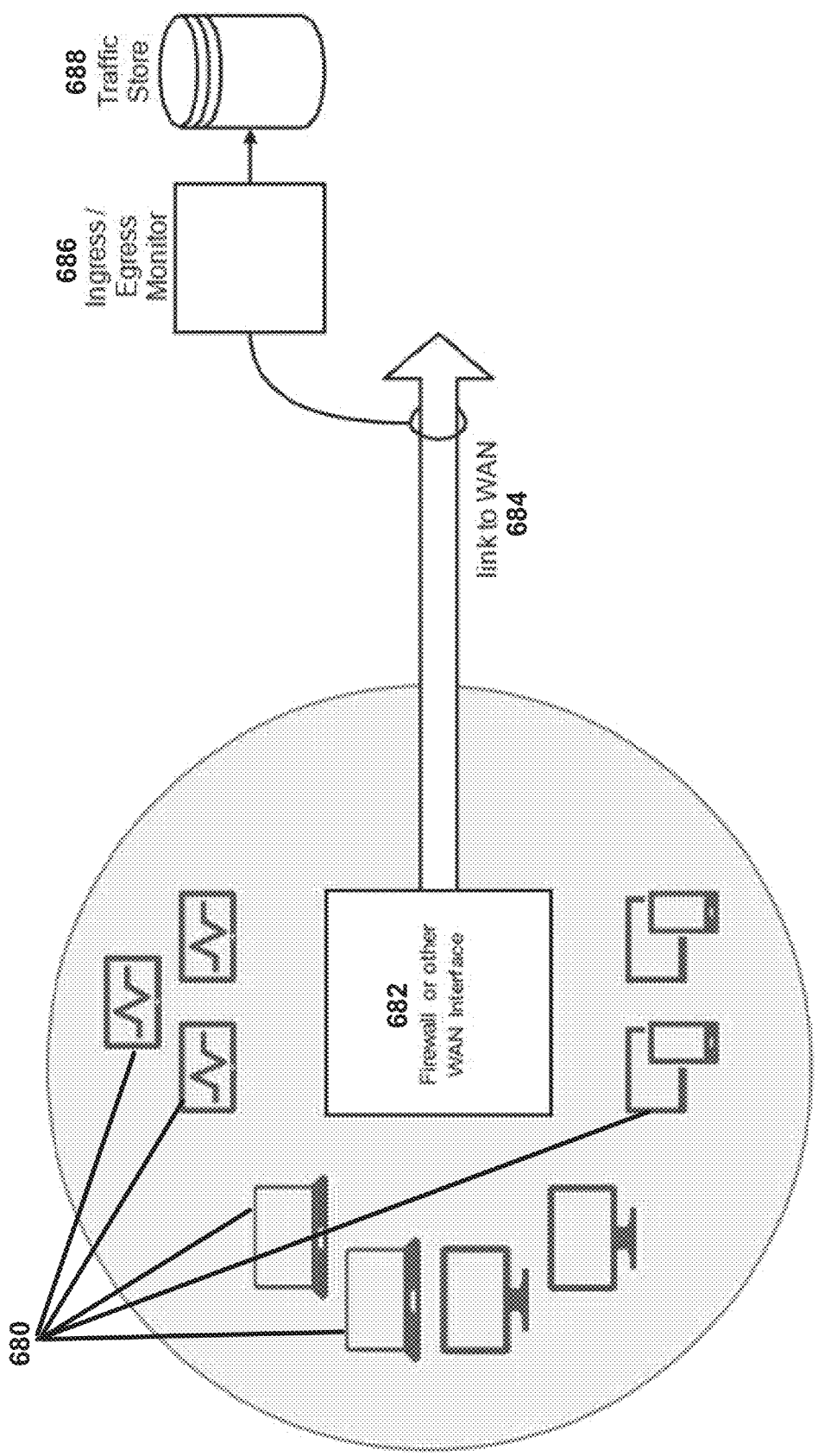
FIG. 6 is a diagram of a passive probe system implementation, in which all, and only, traffic entering and leaving the local area network (LAN) is captured for the traffic store, according to some embodiments.

FIG. 6 is a diagram of a passive probe system implementation, in which all, and only, traffic entering and leaving the LAN is captured for the traffic store, according to some embodiments. As shown in FIG. 6, instead of a compute device directly receiving network traffic data (e.g., via the traffic intake capability/software module) via a SPAN port of a network switch, the compute device (including ingress/egress monitor 686 and traffic store 688) passively "sniffs" the main connection (link to wide area network (WAN) 684) between the firewall or other WAN interface 682 for a network of devices 680, and a WAN such as the internet. The system configuration shown in FIG. 6 may not include the ability to observe and capture LAN-exclusive traffic, however the system configuration of FIG. 6 is immune to SPAN port misconfiguration (i.e., where one or more rules governing SPAN port inbound/outbound traffic are incorrectly defined) and/or dropped data packets.

Figure 7:
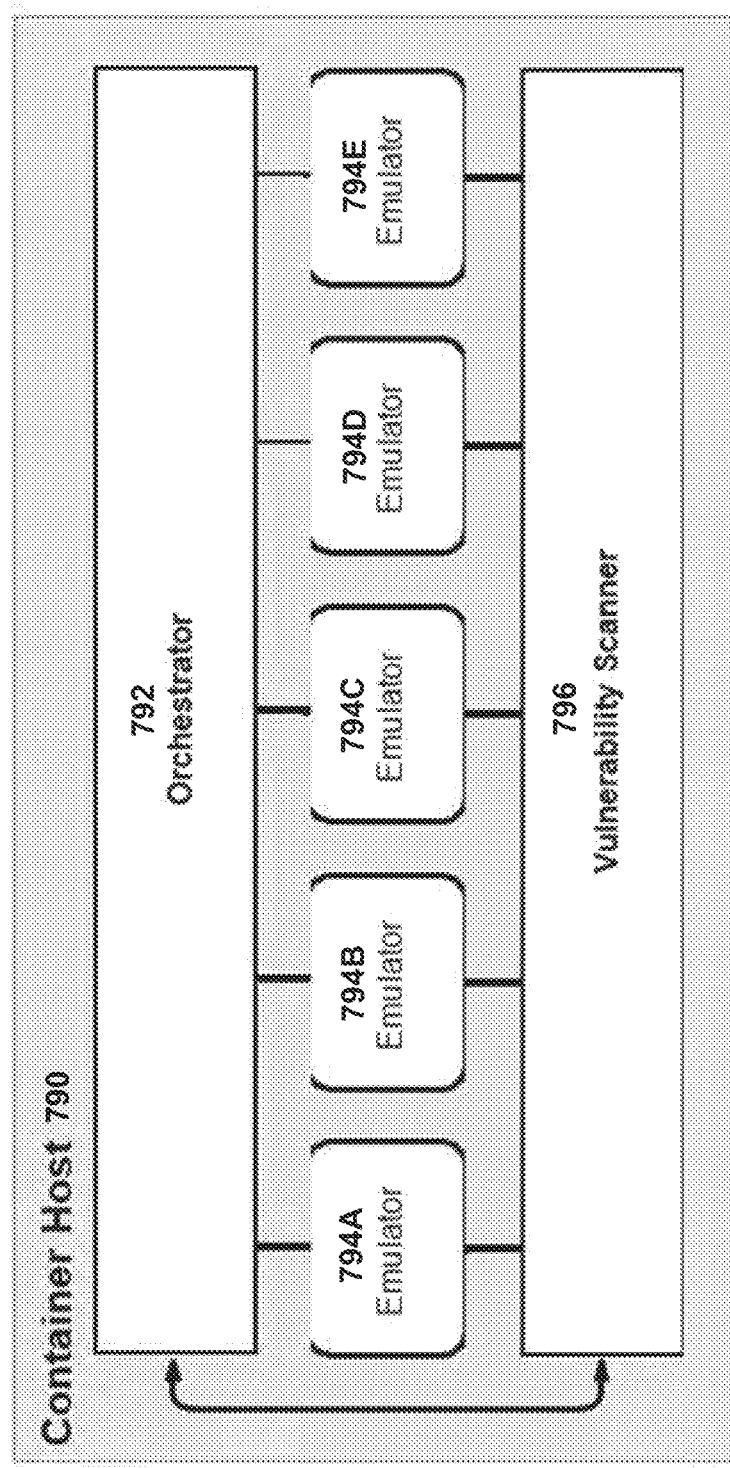
FIG. 7 is a diagram showing a containerized system implementation, in which all device emulators, the orchestrator module and the interrogator are container instances communicating locally on the same physical machine, according to some embodiments.

FIG. 7 is a diagram showing a fully containerized system implementation, in which all device emulators, the orchestrator module and the interrogator are container instances communicating locally on the same physical machine (e.g., over a virtual network), according to some embodiments. The container host 790 of a compute device includes one or more orchestrators 792, one or more interrogators (in this case, a vulnerability scanner 796), and multiple emulators 794A-794E.

Figure 8:
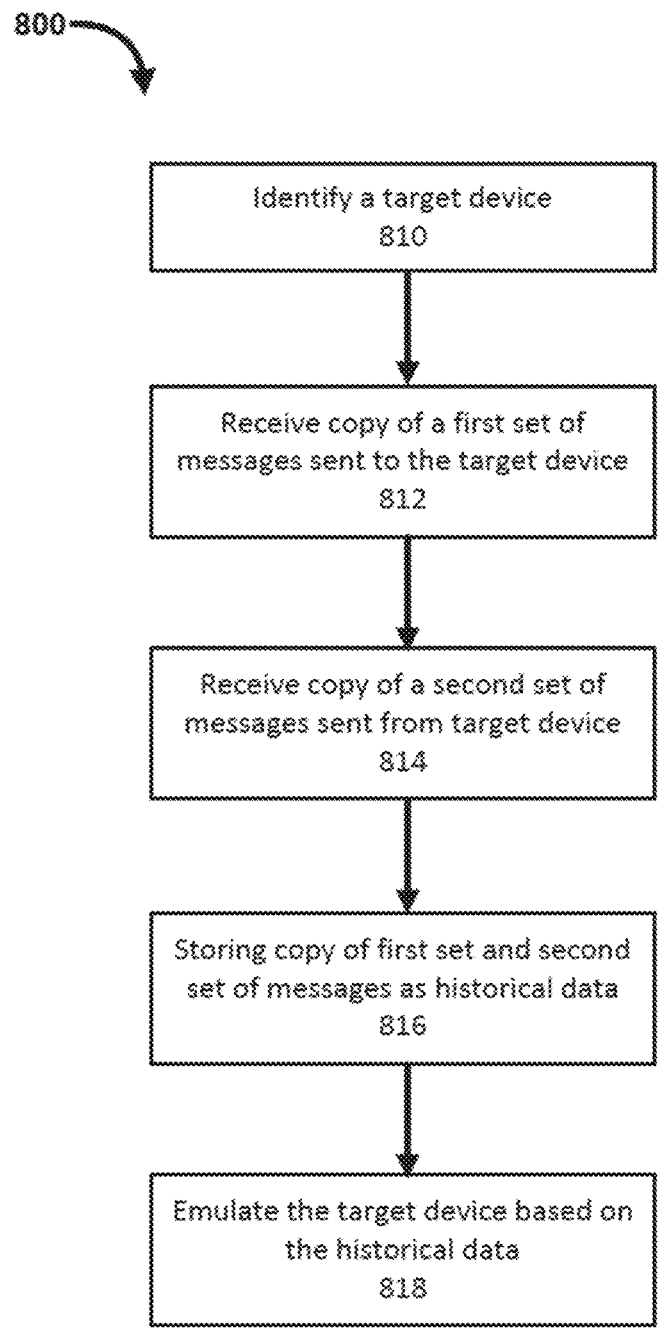
FIG. 8 is a flow diagram showing a method for non-invasive network device inspection, according to some embodiments.

FIG. 8 is a flow diagram showing a method for non-invasive network device inspection, according to some embodiments. As shown in FIG. 8, the method 800 includes identifying a target device at 810, and receiving, at a compute device: a copy of a first set of messages sent to the target device (at 812), and a copy of a second set of messages sent from the target device (at 814), in either order or substantially concurrently. The copy of the first set of messages and the copy of the second set of messages are stored, at 816, as historical data in a memory of the compute device. The device is then emulated, at 818, via a processor of the compute device, based on the historical data stored at 816. The target device can be, for example, a medical device (e.g., medical instrumentation and/or associated compute devices) or any other device that should not receive cybersecurity requests.

The emulating can include receiving a signal encoding a request (e.g., a cybersecurity request) from a remote requestor (e.g., an interrogator), and comparing at least a portion of the request to at least a subset of the historical data, to determine a response representative of a response from the target device. Alternatively or in addition, the emulating can include detecting, based on the historical data, an operating system of the target device, and exhibiting at least one behavior associated with the operating system (e.g., incorporating non-payload data ("additional data") characteristic of that operating system into a data packet, where the additional data is intended for use by the device's network stack, network equipment, etc.). Alternatively or in addition, the emulating can include detecting, based on the historical data, at least one device operably coupled to the target device, and exhibiting at least one behavior associated with being operably coupled to the at least one device. Alternatively or in addition, the emulating can include detecting, based on the historical data, at least one service run by the target device, and exhibiting at least one behavior associated with running the service (e.g., by one or more of specifying a particular port number, using a specific, identifiable data encoding associated with that service, using a request structure and/or a response structure (e.g., XML, JSON, CSV, etc.) associated with that service, specifying a protocol (e.g., HTTP/1.1) associated with that service, etc. The response, once generated by the device emulator, can then be sent to the remote requestor (e.g., interrogator). In some such implementations, the comparing includes comparing a byte distribution of the portion of the request to a byte distribution of the subset of historical data, e.g., to determine an "appropriateness" of an historical response, rather than a similarity. Alternatively or in addition, the comparing can include comparing an operational stage (e.g., login, request received, response received, waiting, execution, sleep/inactive, shutdown, etc.) of the request to an operational stage of the at least a subset of the historical data, and detecting the response includes identifying a match of operational stages (e.g., determining an "appropriateness" of an historical response, rather than a similarity thereof).

Figure 9:
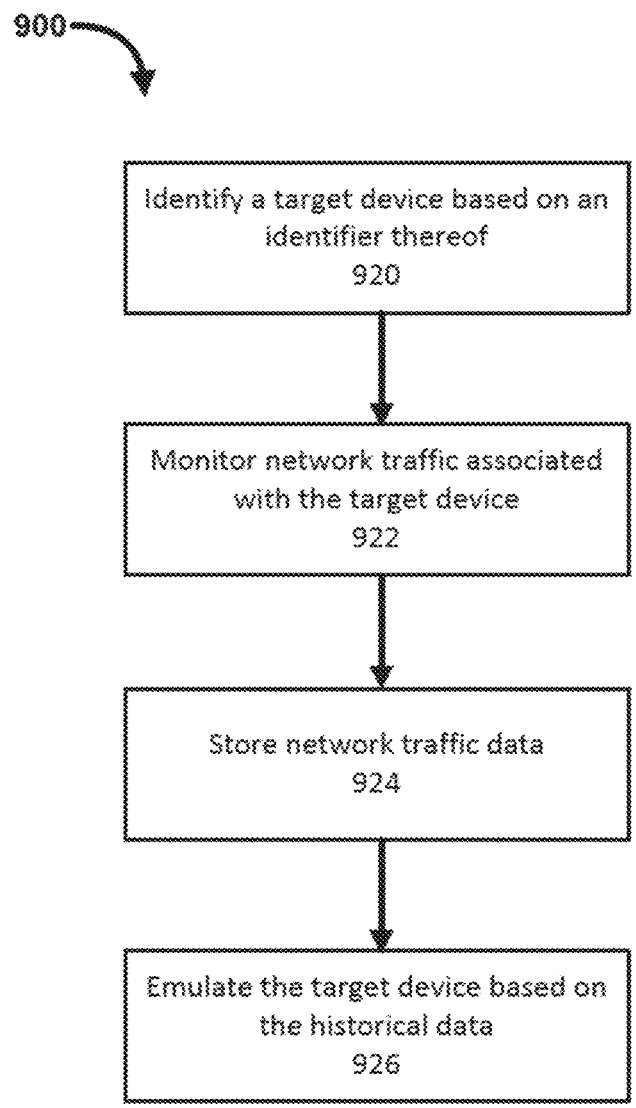
FIG. 9 is a flow diagram showing a method for non-invasive network device inspection, according to some embodiments.

FIG. 9 is a flow diagram showing a method for non-invasive network device inspection, according to some embodiments. As shown in FIG. 9, the method 900 includes identifying, at 920, a target device (e.g., a medical device) based on an identifier of the target device. Network traffic associated with the target device is monitored at a compute device (e.g., via a SPAN port of the network of the target device), at 922. In some embodiments, such monitored network traffic does not include network traffic that was neither sent directly to the target device nor sent directly from the target device. Based on the monitoring, network traffic data is stored, at 924, e.g., in a memory of the compute device. Optionally, the network traffic data can be normalized prior to storing the network traffic data. In some embodiments, the normalization process includes taking the network traffic data (e.g., PCAP files) and generate one or more database files (e.g., via a two-step process). The database files can then be queried for candidate responses (or one or more bases on which candidate responses can be generated) when the emulator receives a request from the interrogator. During normalization, data identified as unnecessary for emulation can be stripped or excluded from the data store. Examples of such unnecessary data include, but are not limited to: absolute timestamps, packet encapsulation, and portions of packet headers that would not be used for emulation purposes.

At 926, the target device is emulated, via a processor of the compute device and based on the historical data. In other words, at 926, a device emulator is generated, invoked, or instantiated. In some embodiments, the target device is emulated without communication between the compute device and the target device, and the emulating is carried out/performed by the device emulator without interaction between the device emulator and the target device. Alternatively or in addition, in some embodiments, the emulating is performed without knowledge of a firmware or hardware of the target device.

In some implementations of the method of FIG. 9, the compute device is a first compute device, and the method 900 also includes receiving a signal at the first compute device, with the signal originating at a second compute device. The emulating can include identifying, in response to receiving the signal, a response based on at least a portion of the stored network traffic data; and sending the response to the second compute device.

Figure 10:
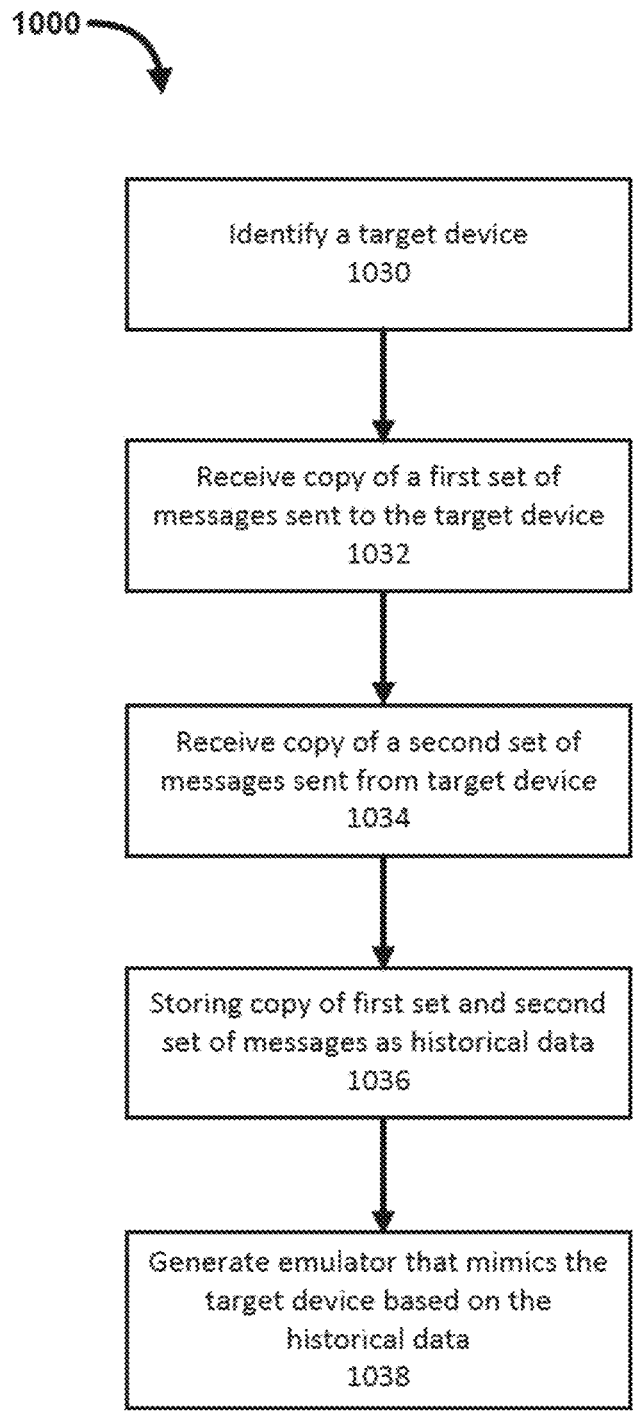
FIG. 10 is a flow diagram showing a method for non-invasive network device inspection, according to some embodiments.

FIG. 10 is a flow diagram showing a method for non-invasive network device inspection, according to some embodiments. As shown in FIG. 10, the method 1000 (which can be implemented, for example, via a non-transitory processor-readable medium storing code representing instructions to cause a processor to perform the noted steps) includes identifying, at 1030 and via a processor of a compute device, a target device (e.g., a medical device). The compute device receives, at 1032, a copy of a first set of messages sent to the target device, and receives, at 1034, a copy of a second set of messages sent from the target device. Steps 1032 and 1034 can performed sequentially and/or iteratively, in any order, and/or can occur substantially in parallel. At 1036, the copy of the first set of messages and the copy of the second set of messages are stored as historical data in a memory of the compute device. An emulator is then generated (or invoked or instantiated), at 1038. The emulator can be configured to mimic an output of the target device, via a processor of the compute device, based on the historical data and without knowledge of a firmware or hardware of the target device.

In some implementations of the method of FIG. 10, the method 1000 also includes detecting sensitive data (e.g., data associated with one or more patients or medical treatments) in at least one of the copy of the first set of messages or the copy of the second set of messages, and "sanitizing" (e.g., deleting, modifying, replacing (i.e., deleting and replacing with another value), obfuscating, masking, randomizing, etc.) the sensitive data to define message information. Alternatively or in addition, the method 1000 can include performing a vulnerability scan on the emulator. Alternatively or in addition, the method 1000 can include identifying a plurality of target devices including the target device; and emulating each target device from the plurality of target devices via the processor of the compute device. Alternatively or in addition, the method 1000 can include detecting that the emulator is ready for testing and, in response to detecting that the emulator is ready for testing, performing a vulnerability scan and/or a device fingerprinting operation on the emulator. Alternatively or in addition, the method 1000 can include receiving a signal originating at a remote compute device; identifying, via the emulator and in response to receiving the signal, a response based on at least a portion of the historical data; identifying a response sequencing based on the historical data; and sending the response to the remote compute device in accordance with the response sequencing.

Although embodiments set forth above have been directed to systems for auditing or identifying/emulating services and devices on a network, in other embodiments, a system is designed with the express intention of permitting external compute devices to be the interrogator, in a honey-pot-style deployment. In some such embodiments, a device emulator may, in addition to determining the most similar or appropriate responses to send to an interrogator in response to a request, the device emulator may also exhibit one or more other behaviors that are characteristic of the target device that the device emulator is emulating. For example, the device emulator may introduce a delay as part of its response, and/or modify one or more bit settings in the header of the response. In some embodiments, modifying header data includes modifying a source address and/or a destination address (e.g., network addresses, such as MAC or IP addresses). Suppose, for example that a packet sent between some_client and some_server has been captured/copied. The traffic store may store the entire packet, including its source and destination addresses. When the packet is later "replayed" during emulation (e.g., sent from the emulator to the interrogator), sending the unmodified packet is not desirable, since the source of the response should be the emulator's address and the destination should be that of the interrogator. The source and destination addresses can therefoe be changed, such that the packet is routed and accepted as expected. Such a modification process can also apply to port data, in addition to or instead of address data.

In other embodiments, a modification can be made with regard to a packet container. Suppose, for example, that an encapsulated packet has been captured, where the encapsulated packet includes a payload that is encapsulated inside of some other container (e.g., in a VPN or other tunneling situation). The inner portion of the packet (e.g., the payload) can be "unencapsulated," and the container can be discarded, such that when an associated response is later sent, during emulation, from the emulator to the interrogator, the response includes only the inner portion of the packet, not the entire encapsulated packet (which may not be understood by the interrogator).

Honey-pot implementations of the present disclosure, based primarily or solely on previously-seen/captured traffic, provide a variety of advantages, which may include (but are not limited to): immunity to any known or yet-unknown vulnerabilities in service daemons, since no real services are running (rather an emulator replaying traffic); secure emulation (without any additional work) of any number of services, whether common or custom, based primarily or solely on previous traffic; the ability to self-update; and being inherently difficult to fingerprint or detect without significant interaction (at which point the goal of the honey-pot has been achieved). Note that although honey-pot emulators exist for many commonly-attacked services, they are not equipped to accommodate recently-developed services, or obscure or infrequently-used services.

In the above description, reference numbers have sometimes been used in connection with various terms. Where a term is used in connection with a reference number, this is meant to refer to a specific element that is shown in one or more of the Figures. Where a term is used without a reference number, this is meant to refer generally to the term without limitation to any particular Figure.

The term "automatically" is used herein to modify actions that occur without direct input or prompting by an external source such as a user. Automatically occurring actions can occur periodically, sporadically, in response to a detected event (e.g., a user logging in), or according to a predetermined schedule. The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, multiple microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

While various embodiments have been described above, it should be understood that they have been presented by way of example only, and not limitation. Where methods and/or schematics described above indicate certain events and/or flow patterns occurring in certain order, the ordering of certain events and/or flow patterns may be modified. While the embodiments have been particularly shown and described, it will be understood that various changes in form and details may be made.

Although various embodiments have been described as having particular features and/or combinations of components, other embodiments are possible having a combination of any features and/or components from any of embodiments as discussed above.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™ Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

The term "computer-readable medium" refers to any available non-transitory tangible medium that can be accessed by a computer or processor. By way of example, and not limitation, a computer-readable medium may comprise RAM, ROM, EEPROM, CD-ROM or other optical disk storage, magnetic disk storage or other magnetic storage devices or any other medium that can be used to carry or store desired program code in the form of instructions or data structures and that can be accessed by a computer. Disk and disc, as used herein, include compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server or other remote source using a coaxial cable, fiber optic cable, twisted pair, digital subscriber line (DSL) or wireless technologies such as infrared, radio, and microwave, then the coaxial cable, fiber optic cable, twisted pair, DSL or wireless technologies such as infrared, radio and microwave are included in the definition of transmission medium.

The methods disclosed herein comprise one or more steps or actions for achieving the described methods. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods and apparatus described herein without departing from the scope of the claims.

The invention claimed is:

1. A method, comprising:
identifying a target device;
receiving, at a compute device, a copy of a first set of messages sent to the target device;
receiving, at the compute device, a copy of a second set of messages sent from the target device;
storing the copy of the first set of messages and the copy of the second set of messages as historical data in a memory of the compute device;
emulating the target device, via a processor of the compute device, based on the historical data, the emulating including:
receiving, from a remote requestor, a signal encoding a request, the request associated with a previous request included in the first set of messages,
comparing at least a portion of the request to at least a subset of the historical data, to determine a response, the response associated with a previous response to the previous request and included in the second set of messages, and
sending the response to the remote requestor.

2. The method of claim 1, wherein the comparing includes comparing a byte distribution of the portion of the request to a byte distribution of the subset of historical data.

3. The method of claim 1, wherein the comparing includes:
comparing an operational stage of the request to an operational stage of the at least a subset of the historical data, and
detecting the response includes identifying a match of operational stages.

4. The method of claim 1, wherein the emulating further includes:
detecting, based on the historical data, an operating system of the target device, and
exhibiting at least one behavior associated with the operating system.

5. The method of claim 1, wherein the emulating further includes:
detecting, based on the historical data, at least one device operably coupled to the target device, and
exhibiting at least one behavior associated with being operably coupled to the at least one device.

6. The method of claim 1, wherein the emulating further includes:
detecting, based on the historical data, at least one service run by the target device, and
exhibiting at least one behavior associated with running the service.

7. The method of claim 1, wherein the request is a cybersecurity request, and the target device is a device that should not receive cybersecurity requests.

8. A method, comprising:
identifying a target device, based on an identifier of the target device;
monitoring, at a compute device, network traffic associated with the target device;
storing, based on the monitoring, network traffic data;
emulating the target device, via a processor of the compute device without communicating with the target device and without interacting with the target device during the emulating, the emulating including (1) comparing at least a portion of a received request associated with a previous request sent to the target device, and (2) determining a response based on a previous response associated with the previous request.

9. The method of claim 8, wherein the emulating is performed without knowledge of a firmware or hardware of the target device.

10. The method of claim 8, further comprising normalizing the network traffic data prior to storing the network traffic data.

11. The method of claim 8, wherein the compute device is a first compute device, the method further comprising receiving a signal at the first compute device, the signal originating at a second compute device, the emulating including:
identifying, in response to receiving the signal, a response based on at least a portion of the stored network traffic data; and
sending the response to the second compute device.

12. The method of claim 8, wherein the network traffic does not include network traffic that was neither sent directly to the target device nor sent directly from the target device.

13. The method of claim 8, wherein the monitoring of the network traffic associated with the target device is performed via a Switched Port Analyzer (SPAN) port of a network of the target device.

14. The method of claim 8, wherein the target device is a medical device.

15. A non-transitory processor-readable medium storing code representing instructions to cause a processor to:
identify, via a processor of a compute device, a target device;
receive, at the compute device, a copy of a first set of messages sent to the target device;
receive, at the compute device, a copy of a second set of messages sent from the target device;
store the copy of the first set of messages and the copy of the second set of messages as historical data in a memory of the compute device;
receive, at the compute device, a signal indicating a request from a requestor, the request associated with a previous request included in the first set of messages; and
generate an emulator configured to mimic an output of the target device, via a processor of the compute device, based on a previous response to the previous request that is included in the second set of messages and without knowledge of a firmware or hardware of the target device.

16. The non-transitory processor-readable medium of claim 15, wherein the code further represents instructions to cause the processor to:
detect sensitive data in at least one of the copy of the first set of messages or the copy of the second set of messages; and
one of modify or delete the sensitive data to define message information.

17. The non-transitory processor-readable medium of claim 15, wherein the code further represents instructions to cause the processor to perform a vulnerability scan on the emulator.

18. The non-transitory processor-readable medium of claim 15, wherein the code represents instructions to cause the processor to:
identify a plurality of target devices including the target device; and
emulate each target device from the plurality of target devices via the processor of the compute device.

19. The non-transitory processor-readable medium of claim 15, wherein the code further represents instructions to cause the processor to:

detect that the emulator is ready for testing; and
in response to detecting that the emulator is ready for testing, perform a vulnerability scan on the emulator.

20. The non-transitory processor-readable medium of claim 15, wherein the code further represents instructions to cause the processor to:
detect that the emulator is ready for testing; and
in response to detecting that the emulator is ready for testing, perform a device fingerprinting operation at the emulator.

21. The non-transitory processor-readable medium of claim 15, wherein the signal is a first signal and the code further represents instructions to cause the processor to:
receive, at the compute device, a second signal originating at a remote compute device;
identify, via the emulator and in response to receiving the second signal, a response based on at least a portion of the historical data;
identify a response sequencing based on the historical data; and
send the response to the remote compute device in accordance with the response sequencing.

22. The method of claim 15, wherein the target device is a medical device.

* * * * *